June 17, 1952   J. L. HATHAWAY ET AL   2,600,870
SYNTHETIC REVERBERATION SYSTEM
Filed Feb. 20, 1947   2 SHEETS—SHEET 1

INVENTORS
JARRETT L. HATHAWAY
& JOSEPH G. PETIT
BY
ATTORNEY

June 17, 1952     J. L. HATHAWAY ET AL     2,600,870
SYNTHETIC REVERBERATION SYSTEM
Filed Feb. 20, 1947     2 SHEETS—SHEET 2
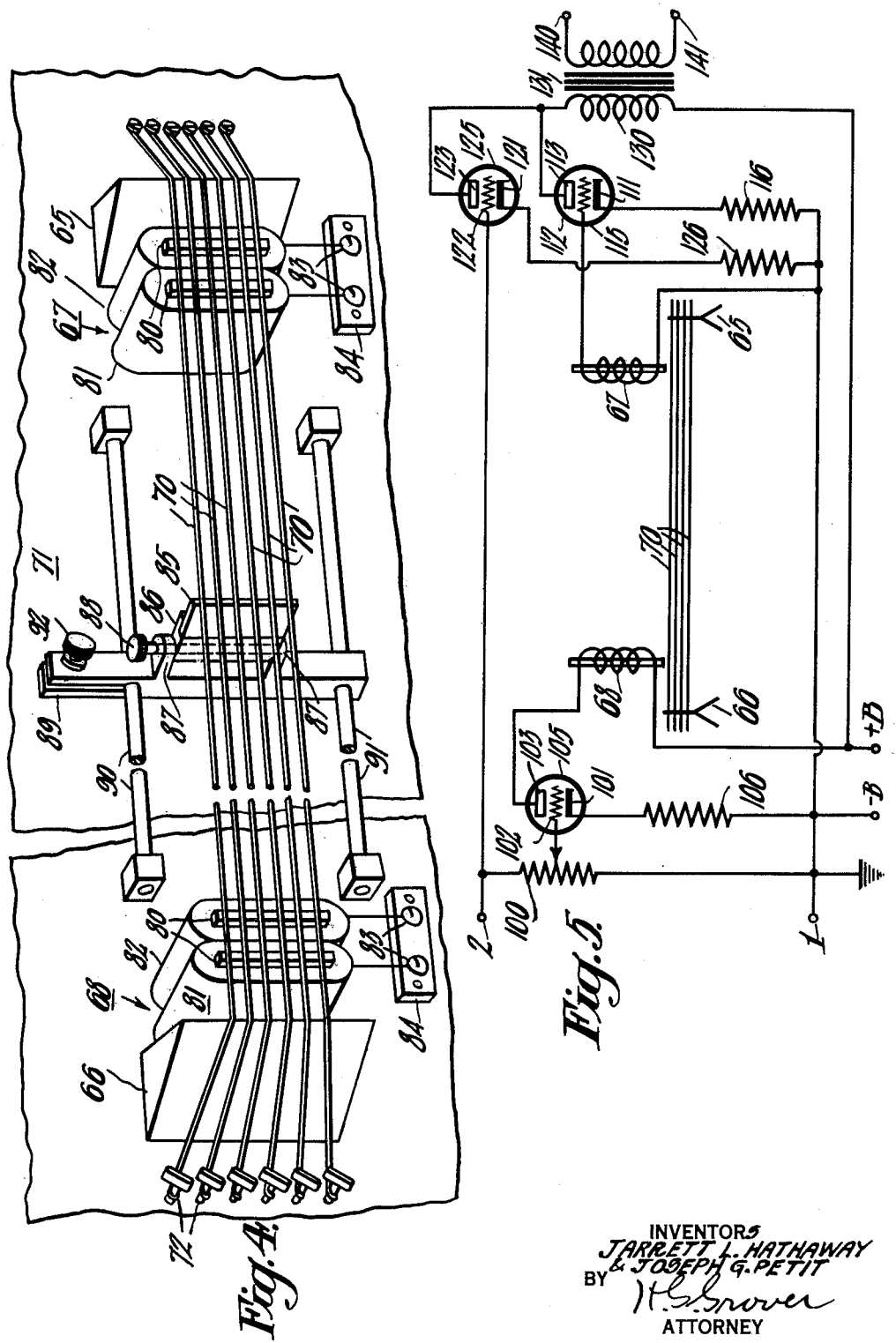
INVENTORS
JARRETT L. HATHAWAY
& JOSEPH G. PETIT
BY H. S. Grover
ATTORNEY Patented June 17, 1952

2,600,870

UNITED STATES PATENT OFFICE 2,600,870

SYNTHETIC REVERBERATION SYSTEM

Jarrett L. Hathaway, Manhasset, and Joseph G. Petit, Port Jefferson, N. Y., assignors to Radio Corporation of America, a corporation of Delaware Application February 20, 1947, Serial No. 729,774

12 Claims. (Cl. 178—44)

The present invention relates to a system for lengthening pulses whereby trains of incoming wave energy of short duration may be effectively lengthened. The system has a particular application as a means for producing artificial reverberation without requiring the use of reverberation chambers.

An object of the present invention is to provide means for increasing the time duration of pulses of any given frequency so that they may be more readily utilized in succeeding devices, or more readily heard by the human ear or viewed on the screen of an oscilloscope.

Another object of the present invention is to provide a device capable of producing a gradual decay following short pulses fed into the device.

Still another object of the present invention is to provide a device for introducing artificial reverberation on voice or program signals.

Another object of the present invention is to artificially produce reverberation without requiring the use of reverberation or echo chambers.

The foregoing objects and others which may appear from the following detailed description are attained by utilizing a number of sharply tuned circuits, each of which may be excited into oscillation by signals of the frequency to which it is tuned. For frequencies other than those exactly resonant, the circuits most closely adjacent the frequency are excited to the greatest extent. After the incoming signal or pulse has ceased the circuit or circuits continue to oscillate, the amplitude of oscillation decaying at a rate depending upon the circuit "Q" or figure of merit of the resonant circuit. The circuit "Q" may be defined as a quantity proportional to the ratio of the energy stored to the energy lost per cycle. The quantity Q is a measure of the damping of a freely oscillating circuit. Thus high Q circuits provide for a greater degree of pulse lengthening but require the use of a larger number of resonant circuits since each circuit is more sharply tuned and thus responds to a narrower frequency spectrum. Expressed in another way, since the decay period is a function of the Q of the resonant systems involved approximately Q cycles are required for any system to reach a final steady set value. Thus, if the applied frequency is 1,000 cycles per second and the Q of the circuit is 1,000, the decay period will be one second. When long decay periods are required, it will thus be apparent that the tuned circuit resonators must be tuned to closely adjacent frequencies to provide a substantially uniform response. Thus to cover a broad band of frequencies a large number of resonant circuits are required.

However, another aspect of the present invention provides a system whereby each of the resonant circuits individually responds to a larger number of frequencies, harmonically related to one another, thus decreasing the number of resonant circuits required.

In the electrical circuit embodiment, to be later described, regenerative amplification is utilized in the tuned circuits, thus producing extremely high effective values of Q which are well above those ordinarily obtainable.

The present invention will be more fully understood by reference to the following detailed description which is accompanied by a drawing in which:

Figure 1 illustrates in block diagram form, one type of pulse lengthening circuit, while

Figure 4 illustrates in perspective a structural embodiment utilizing the principles shown generally in Figure 3, and Figure 5 is a diagram illustrating a typical circuit arrangement which may be employed with the structure shown in Figure 4.

Figure 1:
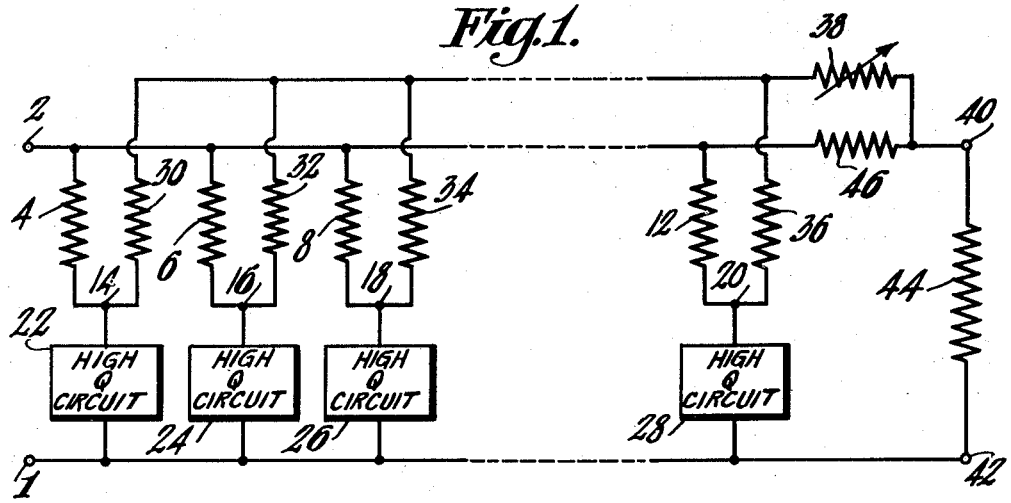

Referring now to Figure 1, a pair of input terminals 1 and 2 are shown to which the signals are applied for adding the artificial reverberation. From the line connected to terminal 2 are bridged isolation resistors 4, 6, 8 and 12. These resistors connect at junction points 14, 16, 18 and 20 to the high Q circuits 22, 24, 26 and 28 and also to the output isolation resistors 30, 32, 34 and 36. The output isolation resistors 30, 32, 34 and 36 are connected through variable attenuator resistor 38 to output terminal 40 and load resistor 44. The other input terminal is directly connected to output terminal 42. This connection may constitute a point of zero reference potential or ground. Signals without added reverberation are fed directly from input terminal 2 to output terminal 40 through resistor 46. The incoming frequencies excite the particular high Q circuits 22, 24, 26 and 28 which are most closely adjacent to resonance. The particular circuits which are actuated into electrical vibration continue after the exciting waves have stopped. The amplitude of vibration in the high Q circuits decays in a manner similar to that of acoustical reverberation systems. By adjustment of attenuator resistor 38 the desired amount of electrical reverberation effect may be added to the signals and by varying the Q of the high Q circuits, the time of reverberation may be varied. While only four high Q circuits have been shown in Figure 1, in practice several more would be added as indicated by the dotted line portions in the center of the figure.

Figure 2:
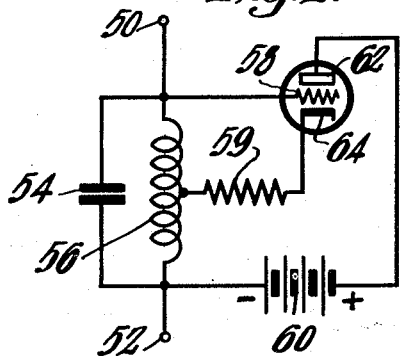
Figure 2 shows a typical simplified regenerative arrangement whereby the Q of the circuits of Figure 1 may be increased many fold.

Figure 2 shows a typical electrical resonant circuit whereby a sufficiently high Q may be obtained from an ordinary tuned circuit to make it have a satisfactory decay time for use in the system shown in Figure 1. The terminals 50 and 52 serve as connections to the circuit of Figure 1 while the tuning elements consist of inductance 56 and capacitor 54. Grid 58 of a vacuum tube is connected to one side of the tuned circuit while the other side of the tuned circuit goes to the negative side of the anode supply battery which is usually grounded or at zero reference potential. The anode 62 of the vacuum tube is connected to the positive side of the anode supply battery 60 while the cathode 64 of the vacuum tube is connected through resistor 59 to an intermediate tap on inductor 56. It will be recognized that this circuit is similar to a conventional oscillator circuit. If resistor 59 is made sufficiently low in value, self oscillation will occur. However, in practice resistor 59 is so adjusted that oscillations do not occur but instead the vacuum tube merely acts to increase the effective Q of the circuit as seen from input terminals 50 and 52. Thus resistor 59 serves as regeneration control and determines by its adjustment the decay of signals applied to the circuit.

In effect the vacuum tube may be considered a negative resistance device capable of neutralizing to any desired extent the inherent resistance of the tuned circuit 54—56.

While the operation of the system as described above is entirely feasible at any desired point in the frequency spectrum, it has been found that many tuned elements are required in order to cover the audio frequency range satisfactorily. However, for purpose other than program reverberation the system as so far described is perfectly satisfactory. It may, for example, be utilized to increase the time duration of pulses so that they may be more readily viewed on an oscilloscope.

Figure 3:
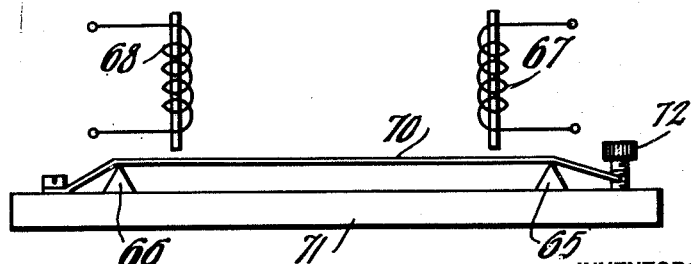
Figure 3 shows another type of pulse lengthening circuit whereby longer decay periods may be obtained.

A different arrangement for providing many high Q circuits with a small number of circuit elements will now be described with reference to Figure 3. Figure 3 shows a mechanical resonance system involving a magnetic string 70 stretched across bridges 65 and 66 suitably arranged on a supporting base 71. The arrangement may be tuned by adjusting the tension of the string 74 by means of tensioning screw 72. The tension may be adjusted so that string 70 resonates at a fundamental frequency low in the audio frequency spectrum. It may be driven by applying an audio frequency voltage across the polarized electromagnet 68 placed as close to the wire 70 as is practical with due consideration to the vibration amplitude of the wire. That is, the wire must never vibrate into or touch the metal pole piece of the electromagnet 68. The distance along wire 70 from bridge 66 to the driver electromagnet 68 determines the ratio of fundamental to harmonic response amplitudes. A small distance results in a greater percentage of harmonics and the production of a greater number of measurable high harmonics. The magnetic pick-up unit 67 is similar to driver 68 and is similarly adjusted close to the wire 70 and to the bridge 65.

Now, since a single string 70 will produce reverberation not only in its fundamental frequency but also in a large number of harmonic frequencies, it is possible, by employing a relatively small number of differently tuned wires, to derive reverberation at closely spaced harmonics over the entire audio spectrum. The wires may be used with separate driver and pick-up magnets but in order to simplify the apparatus, it is preferred that a number of strings be employed with a single set of driver and pick-up magnets. Such an arrangement is shown in Figure 4.

Here, the bridges 66 and 65 support a number of wires 70, all of which are adjusted to slightly different tensions by tensioning screws 72. In the figure we have shown in more detail the construction of the driver electromagnet 68 and the pick-up electromagnet 67. The electromagnets may be similar in form to an ordinary electromagnetic earphone with the diaphragm removed. That is, a pair of closely adjacent rectangular soft iron pole pieces 80 are surrounded by windings 81 and 82. A suitable polarizing magnet, not shown, is connected to the rear ends of pole pieces 80. The leads from the ends of coils 81 and 82 are connected to terminals 83, suitably supported on an insulating block 84. The wires 70 of Figure 4 may be tuned, for example, to 25, 35, 45, 55, 65 and 75 cycles per second. With this tuning, harmonics would fall as follows over the medium low frequency range: 50, 70, 75, 90, 100, 105, 110, 125, 130, 135, 140, 150, 165, 175, 180, 195, 200, 210, 220, 225, 260, 270, 275, 300, 325, 330, 375. It is evident that more strings, tuned to still other fundamental frequencies, would cause the harmonics to fall even closer together and thus fill in the audio spectrum more completely. It is desirable, in attempting to duplicate the reverberation of larger rooms or caverns, to have the reverberation frequencies as closely spaced as possible; that is, no voids should exist.

In order to provide different degrees of damping of the strings, a mechanical damper arrangement may be utilized. One form which the mechanical damper may take is a thin strip of rubber 85 arranged to be contacted against strings 70 with a varying pressure and at a suitably chosen position along the length of string 70. The variable pressure of the edge of rubber strip 85 against string 70 may be provided by arranging the rubber strip 85 on a carrying member 86 mounted for rotation in bearings 87. By rotating knob 88 the pressure of the rubber strip 85 may be varied. Since it may be desirable to shift the position of rubber strip 85 along the length of wires 70, the bearings 87 may be supported on a carriage 89 slidable along rods 90 and 91 arranged on base plates 71 parallel to and beneath strings 70. If desired one end of the carriage 89 may be split and a thumb screw 92 provided for clamping the carriage on rod 90.

Figure 5 shows a complete controllable artificial reverberation system utilizing the structure of Figure 4. In this figure the structure of Figure 4 is again shown but in schematic form. Here, input terminals 1 and 2 are connected across a variable potentiometer 100, the slider of which is connected to grid 102 of vacuum tube 105. The driving electromagnet 68 is connected between plate 103 of tube 105 and a suitable source of anode potential as indicated by the terminal labeled +B. A suitable grid bias for the proper operation of vacuum tube 105 is provided by connecting a resistor 106 between cathode 101 and the ground or −B terminal. The variable potentiometer 100 adjusts the amount of artificial reverberation relative to the direct program. The tube 105 provides isolation between the reverberation unit and the input terminals, and amplification for feeding the driver unit 68. The pickup unit 67 is connected to apply the reverberating signals from wires 70 to grid 112 of output tube 115. Direct program is supplied from input terminal 2 to the grid 122 of tube 125. The anodes 113 and 123 of tubes 115 and 125 are connected together and through the primary 130 of output transformer 131 to the source of anode potential. Cathodes 111 and 121 of tubes 115 and 125 are connected through resistors 116 and 126 to the ground terminal or to a point of zero reference potential whereby the resistors 116 and 136 furnish operating bias to the grids 112 and 122. Since the anodes 113 and 123 are connected in parallel to the primary 130 of output transformer 131 their outputs are combined and appear at the output terminals 140 and 141 for application to the desired utilization circuit. Thus, by suitably adjusting the position of the variable tap on potentiometer 100 direct program only may be fed through to the output terminals 140 and 141 or any desired amount of artificial reverberation may be added.

What is claimed is:

1. A device for operating a train of wave energy within a band of frequencies including a pair of input terminals adapted to have wave energy applied thereto, means for coupling a control electrode of a vacuum tube to said terminals, a pair of output terminals, means for coupling the output circuit of a vacuum tube to said terminals, a third vacuum tube having its control electrode coupled to said input and its output circuit to said output terminals, a number of stretched strings resonant to low frequencies within said band, a coupling from the output of said first tube to said strings, a coupling from said strings to a control electrode of said second vacuum tube and means for varying the coupling of said first named coupling means.

2. A device for operating a train of wave energy within a band of frequencies including a pair of input terminals adapted to have wave energy applied thereto, means for coupling the control electrode of a first vacuum tube to said terminals, a pair of output terminals, means for coupling the output circuit of a second vacuum tube to said output terminals, a third vacuum tube having its control electrode coupled to said input terminals and its output circuit coupled to said output terminals, a number of stretched strings fundamentally resonant to frequencies within the lowermost portion of said band of frequencies, magnetic means coupling the output of said first tube to said strings, magnetic means coupling said strings to the control electrode of said second vacuum tube, and means for varying the coupling of said first named coupling means.

3. A device for operating a train of wave energy within a band of frequencies including a pair of input terminals adapted to have wave energy applied thereto, means for coupling the control electrode of a first vacuum tube to said terminals, a pair of output terminals, means for coupling the output circuit of a second vacuum tube to said output terminals, a third vacuum tube having its control electrode coupled to said input terminals and its output circuit coupled to said output terminals, a number of stretched strings fundamentally resonant to frequencies within the lowermost portion of said band and harmonically resonant to frequencies within the remaining portion of said band to provide a response substantially uniform over said band of frequencies, magnetic means coupling the output of said first tube to said strings, magnetic means coupling said strings to the control electrode of said second vacuum tube, and means for varying the coupling of said first named coupling means.

4. A device for incorporating a reverberatory effect into a train of wave energy within a band of frequencies including a pair of input terminals adapted to have wave energy applied thereto, means for coupling the control electrode of a first vacuum tube to said terminals, a pair of output terminals, means for coupling the output circuit of a second vacuum tube to said output terminals, a third vacuum tube having its control electrode coupled to said input terminals and its output circuit coupled to said output terminals, a number of stretched strings fundamentally resonant to frequencies within the lowermost portion of said band and harmonically resonant to frequencies within the remaining portion of said band to provide said reverberatory effect substantially uniformly over said band of frequencies, magnetic means coupling the output of said first tube to said strings, magnetic means coupling said strings to the control electrode of said second vacuum tube, variable means for damping the action of said strings, and means for varying the coupling of said first named coupling means.

5. A circuit arrangement for synthesizing reverberation having a pair of input terminals to which pulses of energy within a given frequency band are applied and a pair of output terminals from which said pulses of energy are obtained in substantially original form within said band together with added reverberation effects, said circuit arrangement including one circuit path substantially directly intercoupling said input terminals to said output terminals and another circuit path having means for introducing said reverberation effects interposed therein between said input and said output terminals, said means comprising a plurality of resonant elements quiescent in the absence of said applied pulses and having coupling means connected in parallel to said input terminals and output coupling means connected in parallel to said output terminals to deliver said reverberation effects from each of said resonant elements to said output terminals in the same polarity as that of the energy presented over said direct path, and means interposed in said second path to vary the proportions of said direct and reverberating intercoupling.

6. A wave train system for synthesizing reverberations including a pair of terminals to which wave energy occurring within a band of frequencies is to be applied and a pair of output terminals, a number of elements resonant to frequencies within said band coupled to said input terminals, said resonant elements being dormant until excited by said applied wave energy and having a high figure of merit at which when excited into oscillation said oscillations decay over a relatively long period of time, means for coupling said input terminals directly to said output terminals, means for coupling said resonant elements also to said output terminals to deliver thereat energy from each of said resonant elements in the same polarity as that from said direct coupling, and means for varying the proportions of said direct coupling and said coupling through said resonant elements to said output terminals.

7. A circuit arrangement for synthesizing reverberation having a pair of input terminals to which pulses of energy within a given frequency band are applied and a pair of output terminals from which said pulses of energy are obtained in substantially original form within said band together with added reverberation effects, said circuit arrangement including one circuit path substantially directly intercoupling said input terminals to said output terminals and another circuit path having means for introducing said reverberation effects interposed therein between said input and said output terminals, said means comprising a plurality of resonant elements comprising an inductor and a capacitor tuned to a frequency within said band shunted by a negative resistance device for neutralization to a desired extent the losses in said element and having input coupling means connected in parallel to said input terminals and output coupling means connected in parallel to said output terminals to deliver said reverberation effects from each of said resonant elements to said output terminals in the same polarity as that of the energy presented over said direct path, and a variable resistor interposed in series in said second path to vary the proportions of said direct and reverberating intercoupling.

8. A circuit arrangement for synthesizing reverberation having a pair of input terminals to which pulses of energy within a given frequency band are applied and a pair of output terminals from which said pulses of energy are obtained in substantially original form within said band together with added reverberation effects, said circuit arrangement including one circuit path substantially directly intercoupling said input terminals to said output terminals and another circuit path having means for introducing said reverberation effects interposed therein between said input and said output terminals, said means comprising a plurality tuned inductance-capacity circuits tuned to desired frequencies within said band and at least partially shunted by a regeneratively coupled vacuum tube circuit, there being isolating resistors connecting said circuits in parallel to said input terminals and further isolating resistors connecting said circuits in parallel to said output terminals to deliver said reverberation effects from each of said tuned circuits to said output terminals in the same polarity as presented over said direct path, and a variable resistor interposed in series in said second path to vary the proportions of said direct and reverberating intercoupling.

9. A circuit arrangement for synthesizing reverberation having a pair of input terminals to which pulses of energy within a given frequency band are applied and a pair of output terminals from which said pulses of energy are obtained in substantially original form within said band together with added reverberation effects, said circuit arrangement including a resistive path substantially directly intercoupling said input terminals to said output terminals and another circuit path having means for introducing said reverberation effects interposed therein between said input and said output terminals, said means comprising a plurality of parallel connected circuits comprising inductors and capacitors tuned to desired frequencies within said band and having connections to the grid circuit of a vacuum tube across at least a part of the inductor isolating resistors individual to said circuits connecting all of said circuits in parallel across said input terminals and further isolating resistors connecting all of said circuits in parallel across said output terminals to deliver said reverberation effects from each of said parallel connected circuits to said output terminals in the same polarity as the energy presented over said resistive path, and a variable resistor interposed in series in said second path to vary the proportions of said direct and reverberating intercoupling.

10. A device for synthesizing reverberation effects for a train of wave energy within a band of frequencies including a pair of input terminals adapted to have said wave energy applied thereto, a pair of output terminals, a number of elements resonant to frequencies within said band coupled in parallel to said input and said output terminals, said resonant elements being dormant until excited by said applied wave energy and having a high figure of merit at which when excited into oscillation said oscillations decay over a relatively long period of time, each of said resonant elements including a stretched string tuned to a low frequency for said band, electromagnetic means coupling said input and output terminals to said string, and means for coupling said input terminals directly to said output terminals to deliver thereat energy of the same polarity as that from said resonant elements.

11. A circuit arrangement for synthesizing reverberation having a pair of input terminals to which pulses of energy within a given frequency band are applied and a pair of output terminals from which said pulses of energy are obtained in substantially original form within said band together with added reverberation effects, said circuit arrangement including one circuit path substantially directly intercoupling said input terminals to said output terminals and another circuit path having means for introducing said reverberation effects interposed therein between said input and said output terminals, said means comprising a plurality of stretched strings each resonant to a desired frequency within said band and quiescent in the absence of said applied pulses, an input electromagnetic means coupled to said input terminals to excite all of said strings and output electromagnetic means coupled to said output terminals to deliver said reverberation effects from each of said strings to said output terminals in the same polarity as presented over said direct path, and a variable resistor interposed in said second path to vary the proportions of said direct and reverberating intercoupling.

12. A device for synthesizing reverberation of a train of wave energy within a band of frequencies including a pair of input terminals adapted to have said wave energy applied thereto, a number of elements resonant to frequencies within said band coupled to said input terminals, said resonant elements having a high figure of merit at which when excited into oscillation said oscillations decay over a relatively long period of time, each of said resonant elements including a stretched string tuned to a low frequency for said band and electromagnetic means coupling said input and output terminals to said string, means for coupling said input terminals directly to said output and means for coupling each of said resonant elements also to said output in the same polarity as that of energy presented by said direct coupling, and means for varying proportions of said direct coupling and said coupling from said resonant elements to said output terminals.

JARRETT L. HATHAWAY.
JOSEPH G. PETIT.

REFERENCES CITED

The following references are of record in the file of this patent:

UNITED STATES PATENTS

| Number | Name | Date |
|---|---|---|
| 1,961,159 | Miessner | June 5, 1934 |
| 1,961,410 | Wegel | June 5, 1934 |
| 2,001,387 | Hansell | May 14, 1935 |
| 2,001,391 | Miessner | May 14, 1935 |
| 2,184,321 | Soller | Dec. 26, 1939 |
| 2,189,843 | Soller | Feb. 13, 1940 |
| 2,230,836 | Hammond | Feb. 4, 1941 |
| 2,274,370 | Kent | Feb. 24, 1942 |
| 2,493,638 | Olson | Jan. 3, 1950 |
| 2,509,923 | Hanert | May 30, 1950 |